Sept. 3, 1963    A. E. W. VAN DIEPENBROEK    3,102,586
AIR-CONDITIONING INSTALLATIONS
Filed Dec. 6, 1955    3 Sheets-Sheet 1
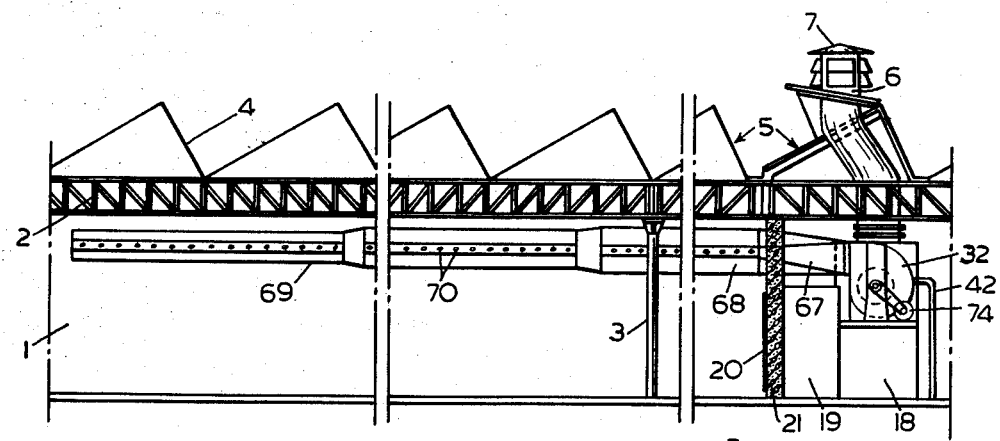
FIG.1
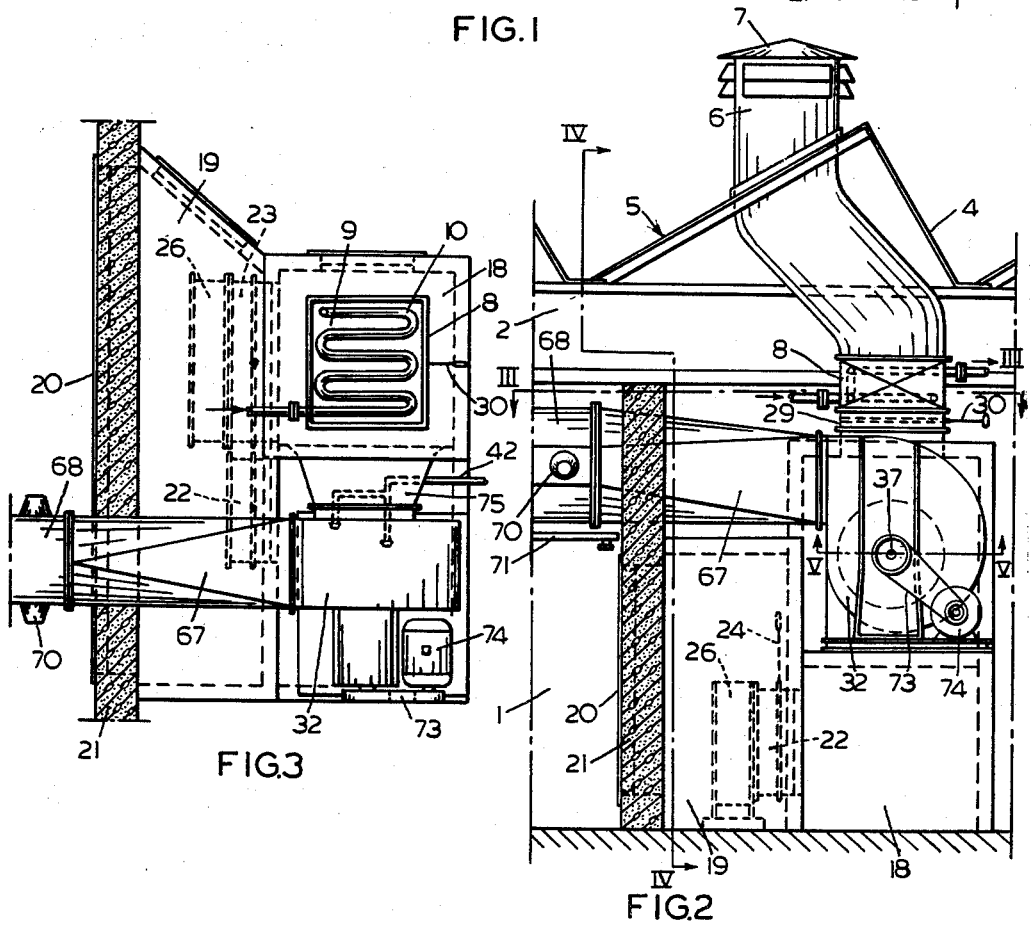
FIG.3
FIG.2

Sept. 3, 1963     A. E. W. VAN DIEPENBROEK     3,102,586
AIR-CONDITIONING INSTALLATIONS Filed Dec. 6, 1955     3 Sheets-Sheet 2

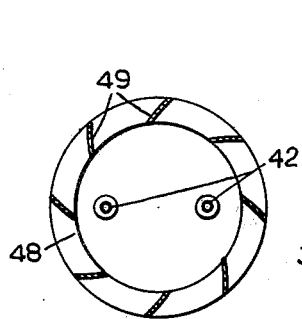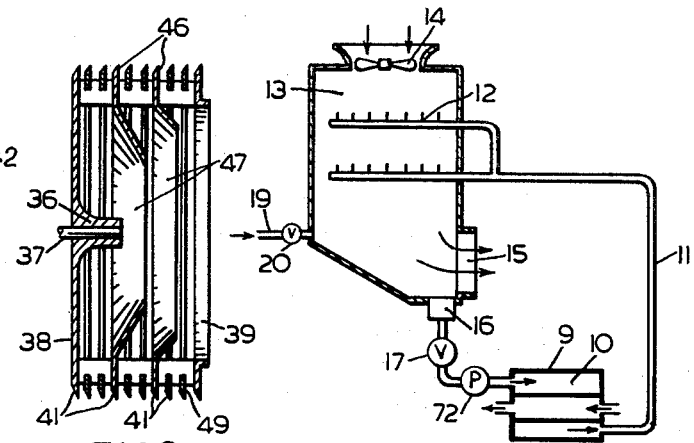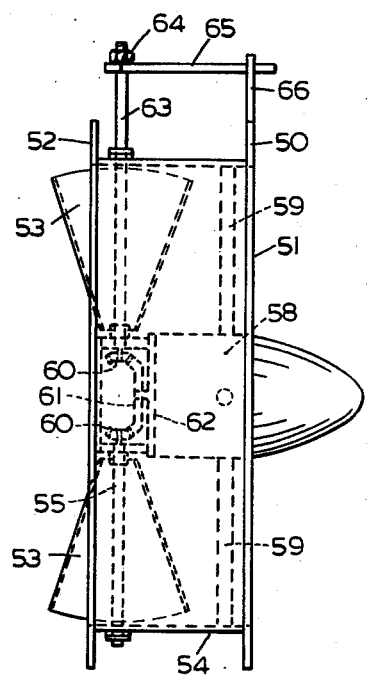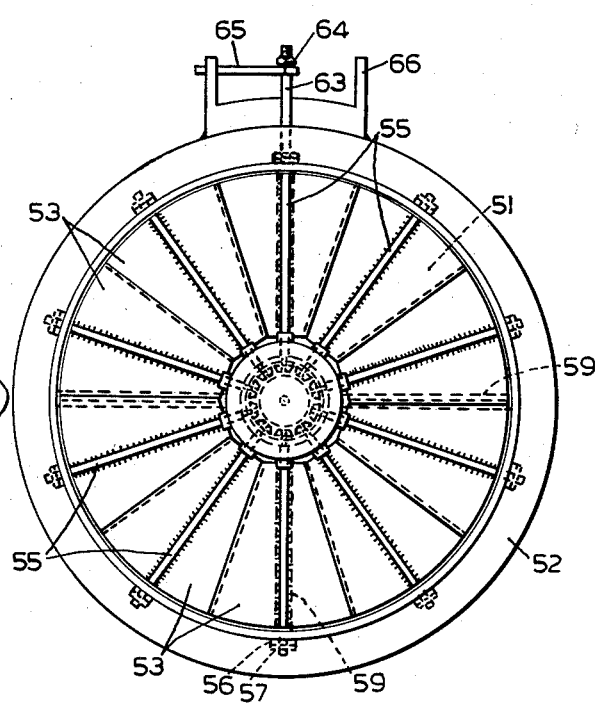

United States Patent Office 3,102,586
Patented Sept. 3, 1963

3,102,586
AIR-CONDITIONING INSTALLATIONS
Alfred E. W. van Diepenbroek, Amersfoort, Netherlands, assignor to N.V. Bronswerk, Amersfoort, Netherlands, a Dutch company
Filed Dec. 6, 1955, Ser. No. 551,448
11 Claims. (Cl. 165—60)

This invention relates to an air-conditioning installation, and in particular to an installation wherein supersaturated air is blown into the room to be conditioned.

An object of the present invention is to provide an air conditioning installation for maintaining predetermined conditions in a room, which attains these desired room conditions with as small a quantity of air as possible.

Another object of the invention is to apply an air-conditioning installation working with supersaturated air in cases wherein a room conditioned should be maintained which lies within the so-called "comfort range" within which the persons working in the room are able to achieve a maximum amount of work.

A further object of the invention is to provide an air-conditioning installation, which is of compact construction, and needs a relatively small space and which is comparatively inexpensive in comparison with known installations with a corresponding capacity. According to the invention, the air-conditioning installation in its simplest form is characterized by an inlet passage for the outside air, a cooling device through which the outside air passes, regulating means controlling the air inlet a ventilating and humidifying device, sucking the cooled outside air through the regulating means, supersaturating the passing air and imparting a velocity thereto, a conduit connected to the ventilating and humidifying device, extending through the room to be conditioned and a plurality of outlet passages arranged along the said conduit.

Consequently, the air is cooled at first in such a way that its heat contents decrease, before being supersaturated.

From the known diagrams indicating the relation between the humidity, the temperature, the relative humidity and the heat contents of a complex of air and water, it appears that there exists a relation between the maximum saturation to be allowed, the desired room conditions and the conditions of the outside air.

By cooling the air previous to the supersaturation thereof, the field of application of the room conditions to be obtained by means of an air-conditioning installation in which supersaturated air is used, is considerably enlarged. In addition, these room conditions are attained by using a quantity of air which is considerably smaller than the amount, which would be necessary in the presently used known processes.

This result can be explained by the fact that the normally attainable supersaturation of the air will be considerably increased by the pre-cooling process as may be deduced from the above mentioned diagrams.

The additional moisture is present in the air in the form of very fine water drops, which vaporize immediately when the air is blown into the room to be conditioned, thereby causing an additional cooling effect. This additional cooling effect makes it possible to attain the desired room conditions with a smaller quantity of air than in the case when no supersaturation is used.

The air may be supersaturated in a ventilating- and humidifying device, indicated hereinafter by the term "mist ventilator." The moisture may be supplied to a centrifugal ventilator which receives the air in a pre-whirling condition.

The blade wheel may be provided with at least one disc placed at right angles to the axis of rotation and having a greater diameter than the outside diameter of the blades, while a cage or comb is arranged around the blade wheel.

According to a preferred embodiment, one of the said discs is arranged on each side of the blade wheel. If desired, one or more discs may be arranged between the said two discs which other discs are provided with parts extending into the inlet space of the blade wheel. The object of these extensions is to guide the gas and to catch the moisture supplied to the inlet passage of the ventilator, and to cause a uniform distribution of the gas stream, whereby the loading capacity for the mist produced by the disc is increased and the efficiency of the blade wheel is improved.

It is advantageous to provide one or more rings between the said discs; these rings are arranged along the circumference of the blades and extend through the blades for a short distance only.

Preferably, the said discs and rings are each provided with a sharp edge. Furthermore, it is an advantage to construct the discs and rings in such manner that they reinforce the blade wheel, so that high speeds of rotation are admissible.

Preferably, the blade wheel contains only a small number of blades so that a uniform distribution of the moisture is impeded as little as possible. It is preferred to use short blades of a strongly backwardly inclined shape, so that a high speed of rotation is obtained for the pressure to be produced by the device. The force exerted on the moisture and causing the same to be atomized, is thereby increased.

Preferably, a cage consisting of round rods is arranged around the circumference of the blade wheel at a short distance therefrom. The moisture may be supplied to the device under pressure by means of atomizers or sprayers arranged in the inlet space of the ventilator or the moisture may run, practically without any pressure, to the various points of the inlet space where the said discs are located. The outside air may pass through a whirling device before being introduced into the mist-ventilator.

The object of the whirling device, which is passed by the air before it is introduced into the mist ventilator, is to increase the speed of rotation of the mist ventilator without renouncing the requirements made regarding the output and pressure of the air. This increase of the speed of rotation of the blade wheel causes an increase of the velocity with which the moisture drops leave the blades. Therefore, the whirling device imparts a whirling motion to the passing air, which is directed in the direction of rotation of the blade wheel, so that a relatively smaller output of the ventilator is obtained. Consequently it will be necessary to increase the rotation speed of the ventilator in order to obtain the desired output at the predetermined pressure, which increase causes the desired favourable effect on the moisture drops.

The invention will be more fully explained with reference to the accompanying drawings:

FIG. 1 is an elevational view of an air-conditioning installation according to the invention.

FIG. 2 is a front view of the main part of the installation on a larger scale.

FIG. 3 is a horizontal section of the installation along the line III—III in FIG. 2.

FIG. 7 is a section of the whirling device along the line VII—VII in FIG. 5.

FIG. 8 is a section of a modified embodiment of the blade wheel of the mist ventilator.

FIG. 9 is a side view of a modified embodiment of the whirling device arranged with adjustable vanes.

FIG. 10 is a front view of this whirling device.

FIG. 11 is a schematical representation of a modified embodiment of the cooling device.

Figure 4:
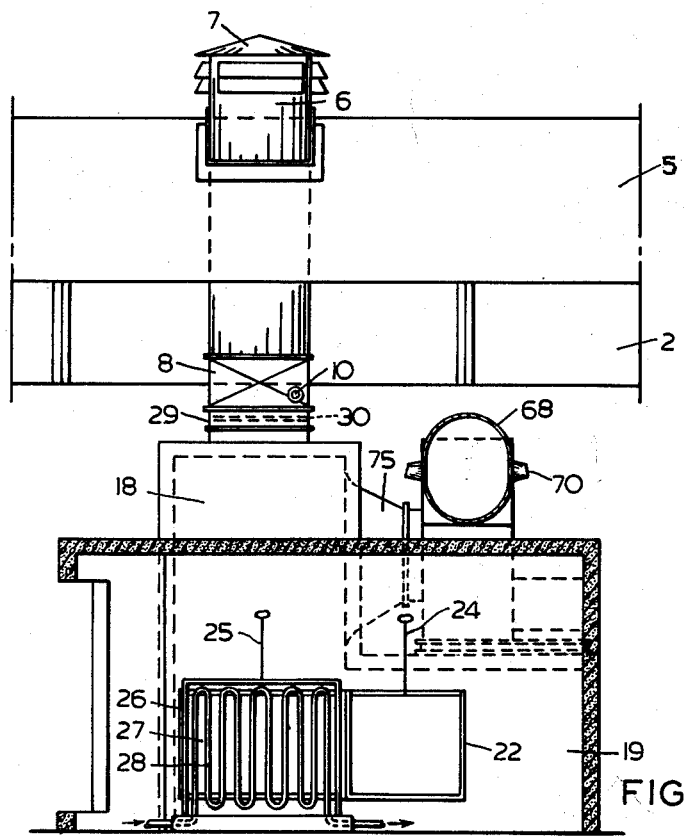
FIG. 4 is a vertical section of the installation along the line IV—IV in FIG. 2.
Figure 5:
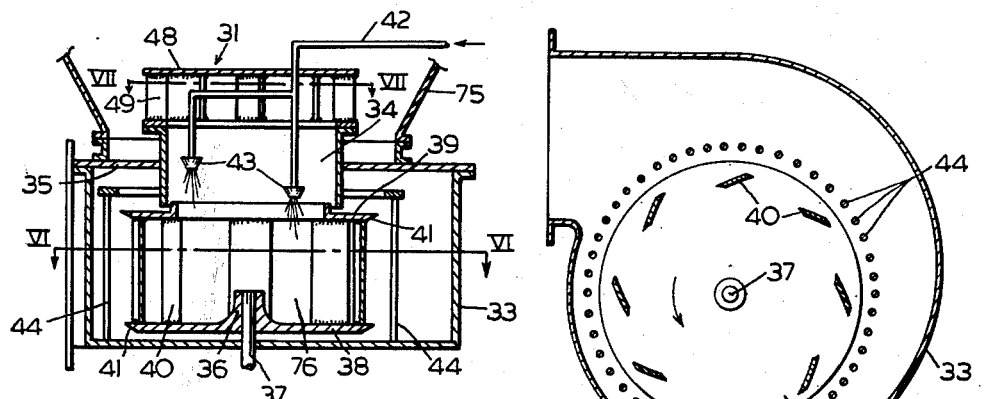
FIG. 5 is a vertical section of the mist ventilator along the line V—V in FIG. 2.
Figure 6:
FIG. 6 is a section of the mist ventilator along the line VI—VI in FIG. 5.

FIG. 1 shows an application of an air-conditioning installation, arranged for the conditioning of air in a factory hall 1, comprising a frame constructed of profiles 2, which are supported by vertical columns 3.

The shed roof 5 is provided with windows 4. Outside air is supplied to the air-conditioning installation through a vertical conduit 6 extending beyond the shed roof 5, and provided with a cap 7.

The outside air passes a cooling device 8 consisting of a cooling chamber 9 through which a cooling water conduit 10 passes. Preferably, the cooling of the air is effected by spring water which passes through the cooling conduit 10. In several countries e.g. in the Netherlands, it is easy even under the most unfavorable summer conditions to obtain air with a heat content of about 4.2 cal./pound by means of a spring water cooler.

By subjecting this air to supersaturation, and by supplying the supersaturated air to the room to be conditioned, a temperature of 64.5° F. may be reached with a relative humidity of 80% and a temperature of 71.5° F. with a relative humidity of 60%. A room temperature of 75° F. with a relative humidity of 80%, which is still quite a tolerable condition, may be obtained by blowing in a quantity of air which amounts to only one tenth of the quantity that would have to be blown in when using any known method at an outside temperature of 86° F. and 40% relative humidity. Moreover, when the invention is used, it is no longer necessary to use only outside air, and in many circumstances inside air or a mixture of inside and outside air may be used to advantage.

If no spring water is available, the air may be cooled by means of cooling water circulating in a closed circuit (FIG. 11). From the cooling chamber 9 a return cooling water conduit 11 leads the return cooling water to a return cooling water spraying device 12 within the evaporation chamber 13. A ventilator 14 blows outside air into the evaporation chamber 13, which air evaporates a part of the cooling water. The humidified air and the water vapor are exhausted through the outlet passage 15 of the evaporation chamber 13, whereas the cooling water of which the temperature has been decreased, leaves through the outlet passage 16 of the cooling- and condensation water, then passes a regulating valve 17, and is reintroduced into the cooling circuit 10 by means of a circulation pump 72. In the above circuit the desired cooling of the cooling water is obtained by evaporation of a part of the water.

The evaporated water is replaced via a replacement cooling water conduit 19, which is provided with a regulating valve 20. If the outside air is very warm and humid, and no cooling water of a sufficiently low temperature is available, so that the cooling must be performed by means of relatively warm cooling water, it is preferred to dehumidify the air by means of an absorption agent before cooling.

The cooled and eventually dehumidified outside air passes a regulating device 29 operated by a sliding valve 30 and is introduced into the mixing chamber 18. In this mixing chamber 18, the outside air is mixed with the return inside air from the factory hall 1.

This return inside air passes a return inside air transit chamber 19, which communicates with the room 1 to be conditioned by means of a grid 20, which is fitted to the partition wall 21. Between the inside air transit chamber 19 and the mixing chamber 18 two regulating valves 22 and 23 are fitted, which may be opened, partly opened or closed by means of sliding valves 24 and 25.

The inside air regulating valve 23 is coupled to an air heater 26. This air heater 26 consist of a chamber 27 through which the return inside air passes, and in which a heating conduit 28 is mounted, through which the heating medium, e.g. steam, is led.

When both sliding valves 24 and 25 are closed, the air-conditioning installation operates solely with outside air. On the other hand when the device 29 is closed and the sliding valve 24 is opened, the installation operates solely with inside air. When the sliding valves 24 and 30 are opened and the sliding valve 25 is closed, the air-conditioning installation operates with a mixture of outside air and inside air, the latter being not heated. The composition of the mixture may be modified by adjusting the valves 30 and 24.

If during the winter a pre-heating of the return inside air is desired the air heater 26 is brought into operation, while the sliding valve 24 is closed and the sliding valve 25 is opened. The return inside air then passes the air-heater 26 and is introduced into the mixing chamber 18 in heated condition.

From the mixing chamber 18, the air is sucked into a ventilating and humidifying device 32, which is provided with a frame 75, which is fitted to the upper side of the mixing chamber 18. The mist ventilator 32 consists of a ventilator housing 33, comprising an inlet passage 34 and a cover plate 35 and contains a blade wheel 36 with a shaft 37 driven by an electromotor 74 through the intermediary of a transmission 73. The blade wheel 36 is provided at its front and rear with discs 38 and 39 respectively, placed at right angles to the shaft 37. The discs 38 and 39 have a larger diameter than the outward diameter of the blades 40 of the ventilator, and are each provided with a sharp outside edge 41.

Air in which water has to be taken up in the form of a finely divided mist is sucked from the mixing chamber 18 through the inlet passage 34 into the ventilator 32, preferably this air has passed a whirling device 31 previously. For this purpose, the water which is supplied through a conduit 42 is sprayed under pressure into the ventilator 32 by means of sprayers 43 arranged in the inlet space 34. The inflowing water is supplied, either directly or indirectly via the blades 40 to the discs 38 and 39, so as to be thrown outwards over the sharp edges 41 of these discs. The water that is thrown off hits the round rods 44 of the cage arranged around the blade wheel whereby the water is partly atomized to a fine mist, which is taken along by the air stream leaving the device. The superfluous water may be drained off at 45. The blades 40 are few in number and short, and they are inclined strongly backwardly, so that the blade wheel 36 rotates at a relatively high circumferential speed.

FIG. 8 shows a modified construction of the blade wheel 36 in which two discs 46 are arranged between the discs 38 and 39; the discs 46 also have a sharp outside edge 41 and are each provided with an extension 47 extending into the inlet space 76 of the ventilator 32. These extensions 47 are shaped in such manner that they may serve for guiding the air as well as for catching the water.

Furthermore, a plurality of rings 49 are provided between the discs 38, 46 and 39; these rings 49 extend through the blades 40 over a short distance only and serve for removing the water present on the blades 40 or reaching the rings 49 along any other way. For this purpose, the rings 49 are each provided with a sharp outside edge 41, so that the water is thrown away with a considerable force. The discs 46 and rings 49 are arranged in such manner that they reinforce the blade wheel 36 to a great extent, so that high speeds of rotation can be attained.

The velocity, with which the water leaves the blade wheel 36 has a great influence in obtaining a finely divided mist. In fact the water leaves the discs 38 and 39 in the form of a film, which will be longer drawn and therefore thinner at increased speed, so that such an increase will further a fine division of the water. Furthermore, this water film will possess an increased collision energy, so that the breaking action of the cage formed by the round rods 44 increases, and promotes a fine division of the water.

In this way, an increased circumferential speed of the blade wheel 36 furthers the fine division of the supplied moisture and also the mist formation by the mist ventilator 32 to a great extent.

By choosing an appropriate bladeform, the desired output and air pressure may be obtained by a speed of rotation of the blade wheel 36 which is increased as much as possible, in order to promote the formation of a fine mist, but finally a limit is reached, beyond which it is impossible to meet the requirements regarding output and pressure of the air.

As this speed limit restricts the obtaining of a fine moisture partition and of an improved mist formation, the air is led through a whirling device 31 before being mixed with water and before being introduced into the blade wheel 36 of the mist ventilator 32. By passing the whirling device 31, the air obtains a whirling motion with the same direction of rotation as the direction of rotation of the blade wheel 36 of the ventilator 32.

In the normal working condition, the air enters the ventilator 32 with a considerable whirl. This whirl has always a direction of rotation which corresponds with the direction of rotation of the blade wheel 36. The result of this whirl is that, in the normal working condition, the air is led into the blade wheel 36 with a strong pre-whirling motion which partly relieves the blade wheel 36 of its task. In this way, a much smaller output at a predetermined pressure is obtained at a certain speed of rotation than would be possible without this pre-whirling motion of the supplied air. As a result thereof, it is possible in this way, to increase the circumferential speed of the blades 40, and also the velocity with which the moisture drops leave the blades 40 without renouncing the requirements made regarding the output and pressure of the air.

Therefore, the air passes the whirling device 31 before being mixed with water and before being led into the blade wheel 36. The whirling device consists of a housing 48, which is provided with tangential vanes 49. These vanes 49 are arranged in such a way that the air passing these vanes obtains a whirling motion, with a direction of rotation which corresponds with the direction of rotation of the blade wheel 36. These tangential vanes 49 are fixed to their housing 48 and are not adjustable. Their position is determined in such a manner that the mist ventilator 32 delivers the desired output at the predetermined pressure by a number of revolutions which is high enough to obtain the desired fine division of the water. Due to the application of this whirling device 31 an increased speed of rotation of the mist ventilator 32 is required for obtaining the desired output at a predetermined pressure, which increased speed improves the fine division of the moisture.

As the alteration of the ventilator characteristic which is caused by the pre-whirling motion, at least theoretically, takes place without loss, the consumption of energy of this mist ventilator 32 with increased speed of rotation will not be more than that of a mist ventilator 32 without a whirling device. However, the energy imparted to the water has increased considerably, so that a higher grade of supersaturation, a finer mist, a better efficiency of mist formation and an independent adaptation to the requirements made by the water and by the air to the mist ventilator 32 are obtained.

Another embodiment of the whirling device 31 is shown in FIGS. 9 and 10. This modified whirling device 31 consists of a ring 50, which is fitted to the mixing chamber 18 and comprises an inlet passage 51, a ring 52, and a sleeve 54, between the rings 50 and 52, which is provided with adjustable vanes 53. The vanes 53 are each mounted on a rod 55, which is rotatably fitted to the sleeve 54 by means of a nut 56 and a lock nut 57.

The other end of the rod 55 is rotatably mounted on a hollow shaft 58, which is connected to the sleeve 54 by means of spokes 59. Bevel gear wheels 60 are fitted to the ends of the respective rods 55, and are in engagement with a crown wheel 61 which is situated within the hollow shaft 58 and is rotatably fitted to a partition 62. The vanes 53 can be adjusted by means of a rod 63, which is fitted to the rod 55 of one of the vanes 53.

A handle 65 is fitted to the rod 63 by means of a nut 64. The stroke of this handle 65 is limited by two stops 66, which are mounted on the ring 50. In one of the extreme positions of the handle 65 the vanes 53 are in the position in which the normal working condition of the mist ventilator 32 is obtained.

From this position the vanes 53 can be adjusted only in the direction in which the vanes 53 are more than normally closed. The closed position of the vanes 53 corresponds with the position in which the handle 65 arrives at the second stop 66.

In this embodiment the mist ventilator 32 may be regulated in such manner that at a predetermined pressure the output may be decreased.

The vanes 53 of the whirling device 31 can be adjusted from their normal position, wherein the mist ventilator 32 supplies the normally desired air output at a predetermined pressure, in one direction only, which adjustment increases the whirl in the direction of rotation of the blade wheel 36, so that the output of air decreases.

Consequently the vanes 53 of the whirling device 31 can be adjusted between their normal position and the closed position. However, the arrangement is such that it is impossible to adjust the whirling device 31 in such a manner that a whirl would be obtained, which is of less intensity than the whirl which is obtained in the normal working position, as otherwise the ventilator motor 74 would be overloaded. The exhaust passage of the ventilating and humidifying device 32 is connected via a reducing member 67 to a conduit 68, which extends through the room 1 to be conditioned. The conduit 68 is divided into several segments 69 of reduced diameter, and contains a large number of outlet spouts 70 through which the supersaturated air is blown into room 1.

The condensation water, which may be formed on the outside of the conduit 68, is removed via a return gutter 71.

While only some embodiments of the invention have been shown and described, it is obvious that various modifications can be made without departing from the scope and the true spirit of the invention as set forth in the appended claims.

I claim:

1. An air-conditioning installation, comprising an inlet passage for outside air, a cooling device through which the outside air passes, regulating means controlling the inflow of air, a ventilating and humidifying device effective for sucking the cooled outside air through the regulating means, supersaturating the passing air and imparting a velocity thereto, a conduit connected to the ventilating and humidifying device and extending through the room to the conditioned, and a plurality of outlet passages disposed along said conduit.

2. An air-conditioning installation, comprising an inlet passage for outside air, a cooling device through which the outside air passes, regulating means controlling the inflow of cooled outside air, a mixing chamber receiving the cooled outside air through the outside air inflow regulating means, regulating means connected to the mixing chamber controlling the inflow of inside air, an inside air inlet passage connected to the inside air inlet regulating means, a ventilating and humidifying device, effective for sucking the air from the mixing chamber, supersaturating the passing air and imparting a velocity thereto, a conduit connected to the ventilating and humidifying device and extending through the room to be conditioned, and a plurality of outlet passages disposed along said conduit.

3. An air-conditioning installation, comprising an inlet passage for outside air, a cooling device through which the outside air passes, regulating means controlling the inflow of cooled outside air, a mixing chamber receiving the cooled outside air through the outside air inflow regulating means, two regulating valves controlling the inflow of inside air into the mixing chamber, an inside air transit chamber connected to the mixing chamber by said two regulating valves, an air heater within the transit chamber connected to one of said two regulating valves, an inside air inlet passage connecting the room to be conditioned with the transit chamber, a ventilating and humidifying device effective for sucking the air from the mixing chamber, supersaturating the passing air and imparting a velocity thereto, a conduit connected to the ventilating and humidifying device and extending through the room to be conditioned, and a plurality of outlet passages disposed along said conduit.

4. An air-conditioning installation, comprising an inlet passage for outside air, a cooling device through which the outside air passes, regulating means controlling the inflow of cooled outside air, a mixing chamber receiving the cooled outside air through the outside air inflow regulating means, regulating means controlling the inflow of inside air, an inside air inlet passage connected to the inside air regulating means, a ventilating and humidifying device effective for sucking the air from the mixing chamber, supersaturating the passing air and imparting a velocity thereto, a conduit connected to the ventilating and humidifying device and extending through the room to be conditioned, a plurality of air outlet spouts disposed along said conduit, and a drip gutter for collecting the condensation water formed on said conduit.

5. An air-conditioning installation, comprising an inlet passage for outside air, a cooling device through which the outside air passes, regulating means controlling the inflow of cooled outside air, a mixing chamber receiving the cooled outside air through the outside air inflow regulating means, two regulating valves controlling the inflow of inside air into the mixing chamber, an inside air transit chamber connected to the mixing chamber by said two regulating valves, an air heater within the transit chamber, connected to one of said two regulating valves, an inside air inlet passage connecting the room to be conditioned with the transit chamber, a ventilating and humidifying device effective for sucking the air from the mixing chamber, supersaturating the passing air and imparting a velocity thereto, a conduit connected to the ventilating and humidifying device and extending through the room to be conditioned, a plurality of air outlet spouts disposed along said conduit and a drip gutter discharging the condensation water formed on said conduit.

6. An air-conditioning installation, comprising an inlet passage for outside air, a cooling chamber through which the outside air passes, a cooling conduit within the cooling chamber through which cooling water is circulated, a return cooling water conduit receiving the warmed cooling water from the cooling conduit, a spraying device connected to the return cooling water conduit, an evaporation chamber within which the spraying device is disposed, an outside air inlet passage leading to the evaporation chamber, air ventilating means connected to said inlet passage for the evaporation chamber, a humidified air outlet passage for the evaporation chamber, a relacement cooling water conduit leading to the evaporation chamber, a regulating valve fitted on the replacement cooling water conduit, a cooling water and condensation water outlet passage for the evaporation chamber, a cooling water inlet conduit connecting said water outlet passage of the evaporation chamber with the cooling conduit, a regulating valve fitted on the water inlet conduit, a circulation pump fitted on the cooling water inlet conduit, regulating means controlling the inflow of cooled outside air connected to the cooling chamber, a mixing chamber receiving the cooled outside air through the outside air inflow regulating means, regulating means connected to the mixing chamber controlling the inflow of inside air, an inside air inflow passage connected to the inside air inflow regulating means, a ventilating and humidifying device effective for sucking the air from the mixing chamber, supersaturating the passing air and imparting a velocity thereto, a conduit connected to the ventilating and humidifying device and extending through the room to be conditioned, and a plurality of outlet passages disposed along said conduit.

7. An air-conditioning installation comprising an inlet passage for outside air, a cooling chamber through which the outside air passes, a cooling conduit within the cooling chamber through which cooling water is circulated, a return cooling water conduit receiving the warmed cooling water from the cooling conduit, a spraying device connected to the return cooling water conduit, an evaporation chamber within which the spraying device is disposed, an outside air inlet passage leading to the evaporation chamber, air ventilating means connected to said inlet passage for the evaporation chamber, a humidified air outlet passage for the evaporation chamber, a replacement cooling water conduit leading to the evaporation chamber, a regulating valve fitted on the replacement cooling water conduit, a cooling water and condensation water outlet passage for the evaporation chamber, a cooling water inlet conduit connecting said water outlet passage for the evaporation chamber with the cooling conduit, a regulating valve fitted on the water inlet conduit, a circulation pump fitted on the cooling water inlet conduit, regulating means controlling the inflow of cooled outside air connected to the cooling chamber, a mixing chamber receiving the cooled outside air through the outside air inflow regulating means, two regulating valves controlling the inflow of the inside air into the mixing chamber, an inside air transit chamber connected to the mixing chamber by said two regulating valves, an air heater within the transit chamber connected to one of said two regulating valves, an inside air inlet passage connecting the room to be conditioned with the transit chamber, a ventilating and humidifying device effective for sucking the air from the mixing chamber, supersaturating the passing air and imparting a velocity thereto, a conduit connected to the ventilating and humidifying device and extending through the room to be conditioned, and a plurality of outlet passages disposed along said conduit.

8. An air-conditioning installation, comprising an inlet passage for outside air, means for dehumidifying the outside air, a cooling device through which the outside air passes, regulating means controlling the inflow of air, a ventilating and humidifying device effective for sucking the cooled outside air through the regulating means, supersaturating the passing air and imparting a velocity thereto, a conduit connected to the ventilating and humidifying device and extending through the room to be conditioned, and a plurality of outlet passages disposed along said conduit.

9. An air-conditioning installation, comprising an inlet passage for outside air, means for dehumidifying the outside air, a cooling device, through which the outside air passes, regulating means controlling the inflow of cooled outside air, a mixing chamber receiving the cooled outside air through the outside air inflow regulating means, regulating means connected to the mixing chamber controlling the inflow of inside air, an inside air inlet passage connected to the inside air inflow regulating means, a ventilating and humidifying device effective for sucking the air from the mixing chamber, supersaturating the passing air and imparting a velocity thereto, a conduit connected to the ventilating and humidifying device and extending through the room to be conditioned, and a plurality of outlet passages disposed along said conduit.

10. An air-conditioning installation, comprising an inlet passage for outside air, means for dehumidifying the outside air, a cooling device through which the outside air passes, regulating means controlling the inflow of cooled outside air, a mixing chamber receiving the cooled outside air through the outside air inflow regulating means, two regulating valves controlling the inflow of inside air into the mixing chamber, an inside air transit chamber connected to the mixing chamber by said two regulating valves, an air heater within the transit chamber connected to one of said two regulating valves, an inside air inlet passage connecting the room to be conditioned with the transit chamber, a ventilating and humidifying device effective for sucking the air from the mixing chamber, supersaturating the passing air and imparting a velocity thereto, a conduit connected to the ventilating and humidifying device and extending through the room to be conditioned, and a plurality of outlet passages disposed along said conduit.

11. An air-conditioning installation, comprising an inlet passage for outside air, a cooling device through which the outside air passes, regulating means controlling the inflow of cooled outside air, a mixing chamber receiving the cooled outside air through the outside air inflow regulating means, two regulating valves controlling the inflow of inside air into the mixing chamber, an inside air transit chamber connected to the mixing chamber through said two regulating valves, an air heater within the transit chamber connected to one of said two regulating valves, an inside air inlet passage connecting the room to be conditioned with the transit chamber, a whirling device connected to the mixing chamber through which the air passes, a plurality of vanes mounted on the whirling device and imparting a whirling motion to the air, a centrifugal ventilator connected to the whirling device which sucks in the air and imparts a velocity thereto, a blade wheel rotating in a direction corresponding with the whirling air and provided with a plurality of short blades, water spraying means in the inlet space of the blade wheel, a water supply feeding the water spraying means, two discs each placed at right angles to the axis of rotation at one side of the blade wheel, said discs having a greater diameter than the outside diameter of the blades and provided with a sharp outside edge, a plurality of ringshaped discs with a sharp outside edge disposed between said two discs and provided with an extension extending into the inlet space of the ventilator, a plurality of rings with a sharp outside edge disposed between said two discs and provided with an extension extending into the inlet space of the ventilator, a plurality of rings with a sharp outside edge disposed along the outer edge of the blades and extending through the blades over a short distance only, a cage consisting of round rods disposed around the blade wheel, a conduit connected to the ventilator and extending through the room to be conditioned, a plurality of air outlet spouts disposed along said conduit, and a drip gutter for collecting the water which condenses on the conduit.

References Cited in the file of this patent
UNITED STATES PATENTS

| | | |
|---|---|---|
| 1,330,920 | Stacey | Feb. 17, 1920 |
| 1,895,444 | Cassell | Jan. 31, 1933 |
| 2,114,787 | Smith | Apr. 19, 1938 |
| 2,310,411 | Fisher | Feb. 9, 1943 |
| 2,359,624 | Crawford | Oct. 3, 1944 |
| 2,548,426 | Edberg | Apr. 10, 1951 |
| 2,684,232 | Caldwell | July 20, 1954 |
| 2,708,568 | Marshall | May 17, 1955 |
| 2,712,927 | Blum | July 12, 1955 |